(12) United States Patent
Griffin et al.

(10) Patent No.: US 6,781,791 B1
(45) Date of Patent: Aug. 24, 2004

(54) DISK DRIVE INCLUDING DISK PLATE INCLUDING HEAD AND/OR ARM LIMITER PORTIONS FOR MODIFYING AIRFLOW ADJACENT A DISK

(75) Inventors: Gary C. Griffin, Boulder Creek, CA (US); John R. Gustafson, Los Gatos, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 368 days.

(21) Appl. No.: 10/062,951

(22) Filed: Jan. 31, 2002

(51) Int. Cl.⁷ .......................... G11B 5/10; G11B 5/127; G11B 5/41; G11B 21/08; G11B 5/55
(52) U.S. Cl. ..................... 360/128; 360/265.1
(58) Field of Search ....................... 360/128, 265.1, 360/264.1, 110, 264, 260, 240, 137, 254.7, 254.8

(56) References Cited

U.S. PATENT DOCUMENTS

| | | | |
|---|---|---|---|
| 5,757,587 A | 5/1998 | Berg et al. | |
| 5,801,899 A | * 9/1998 | Genheimer | |
| 6,341,051 B2 | * 1/2002 | Hachiya et al. | |
| 2002/0135933 A1 | 9/2002 | Harrison et al. | |

* cited by examiner

Primary Examiner—Julie Anne Watko
(74) Attorney, Agent, or Firm—Won Tae C. Kim, Esq.; Milad G. Shara, Esq.; Stetina Brunda Garred & Brucker

(57) ABSTRACT

A disk drive that includes a disk drive base, a spindle motor hub, a disk, and a rotary actuator including a distal end and is formed to pivot for translating the distal end adjacent the disk to a parked position. The disk drive includes a disk plate that includes a plate body disposed substantially about and parallel with the disk for modifying air flow adjacent the disk during operation of the disk drive. In an embodiment the disk plate includes a head limiter portion extending from the plate body. The head limiter portion is vertically aligned with the distal end with the distal end in the parked position. In other embodiment the disk plate includes an arm limiter portion vertically aligned with the actuator arm structure with the actuator arm structure in the parked position.

66 Claims, 10 Drawing Sheets

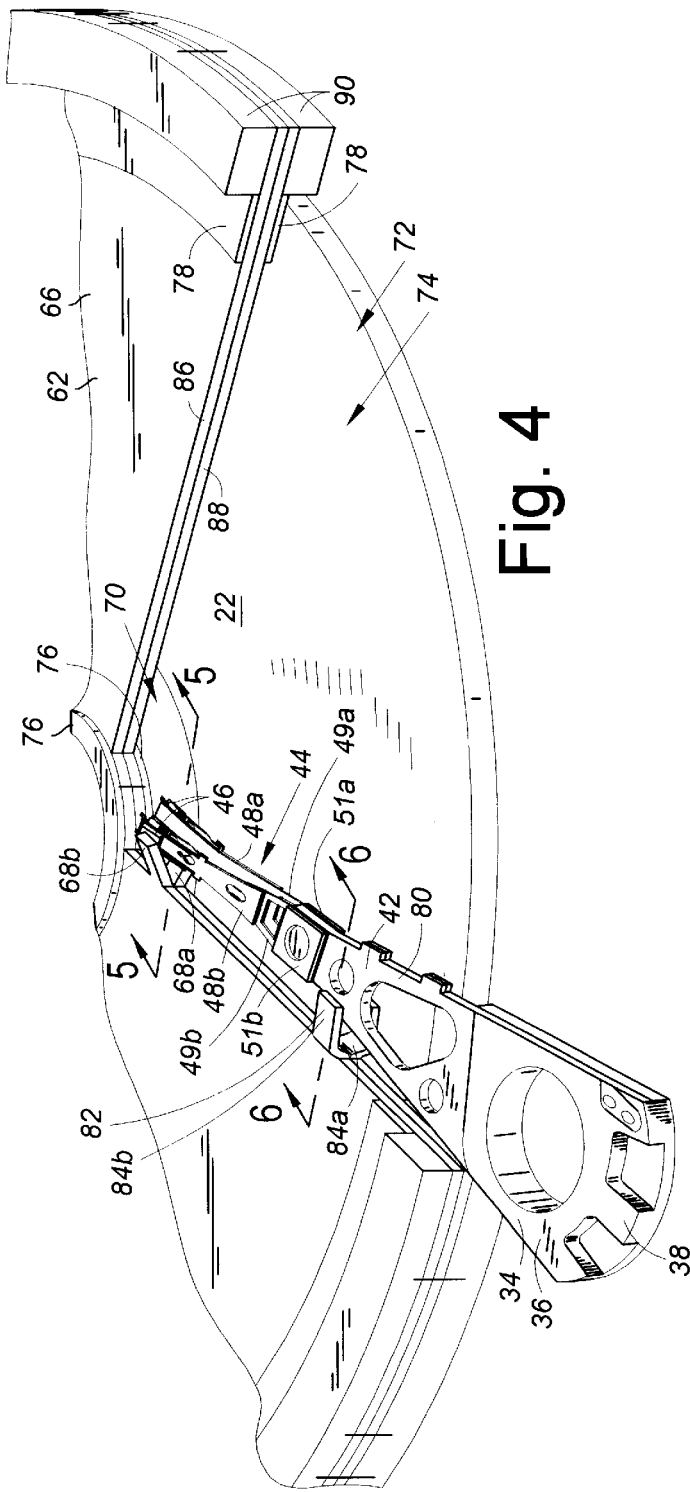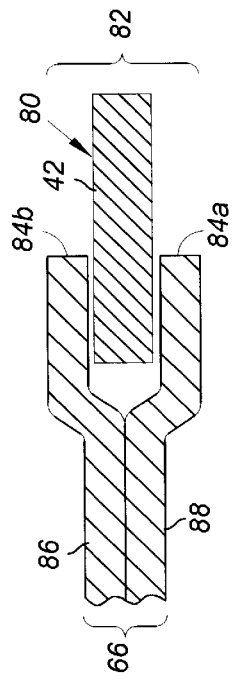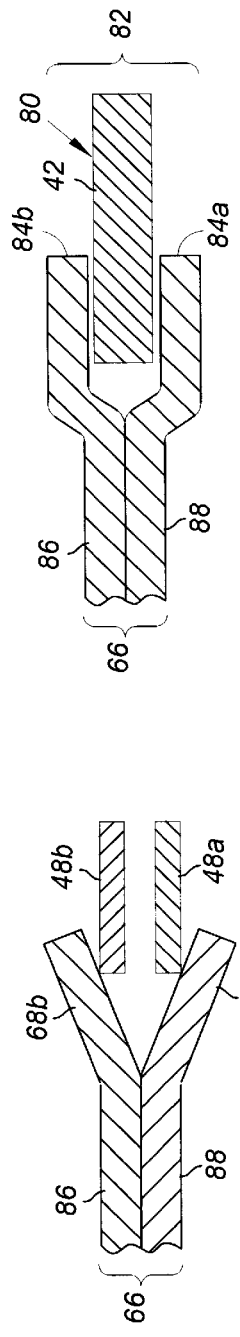

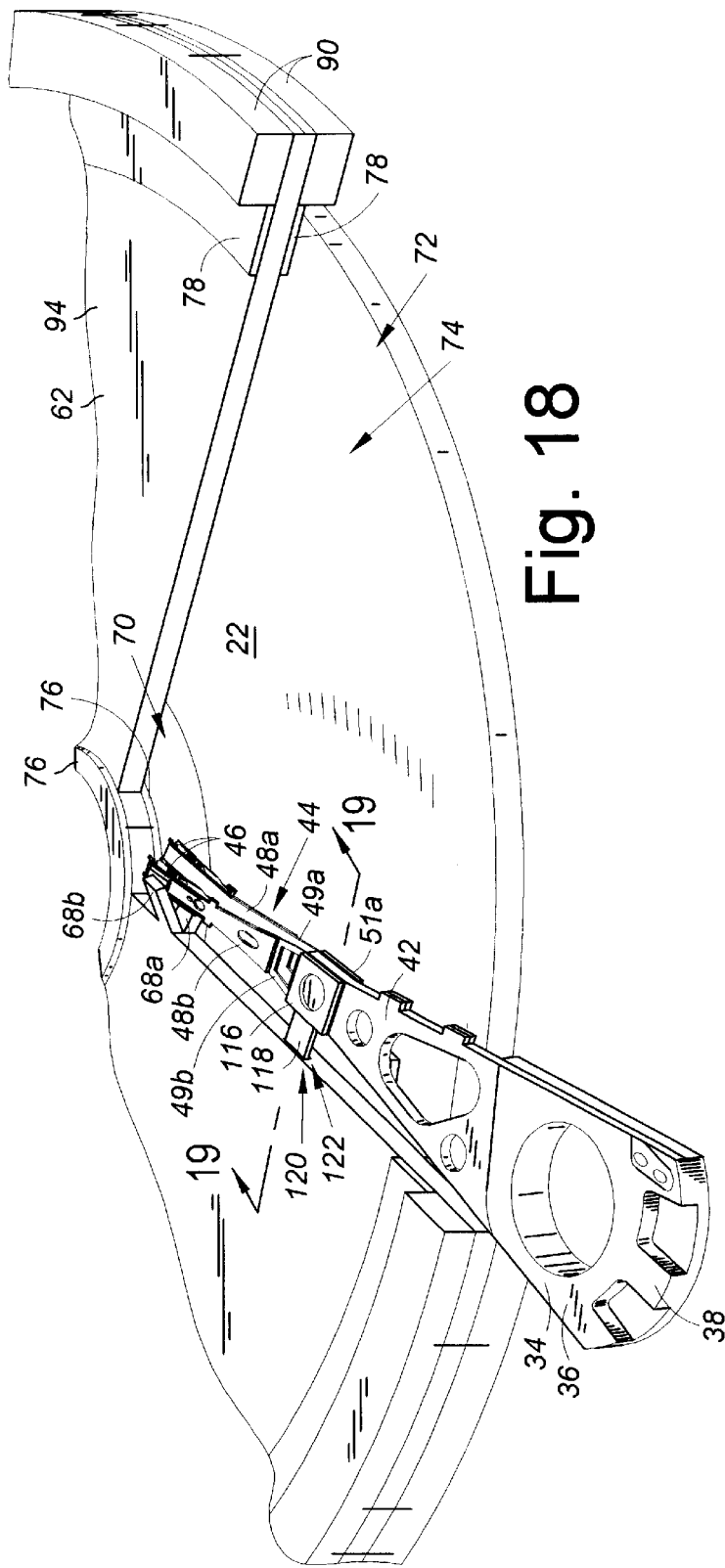
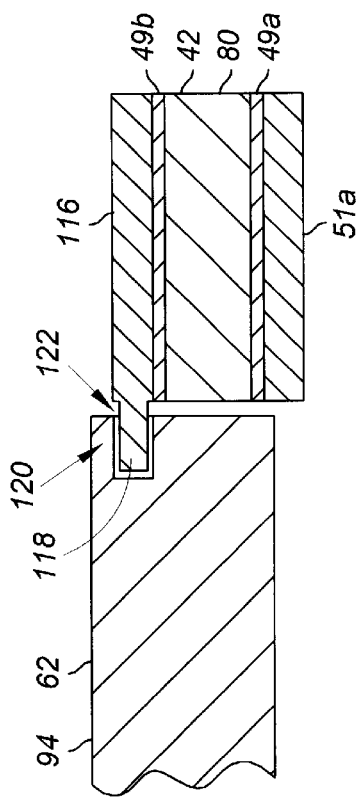
Fig. 18
Fig. 19

DISK DRIVE INCLUDING DISK PLATE INCLUDING HEAD AND/OR ARM LIMITER PORTIONS FOR MODIFYING AIRFLOW ADJACENT A DISK

CROSS-REFERENCE TO RELATED APPLICATIONS

Not applicable.

BACKGROUND OF THE INVENTION

1. Field of the Invention

The present invention relates generally to disk drives, and in particular to a disk drive including a disk plate for modifying airflow adjacent a disk.

2. Description of the Prior Art

The typical hard disk drive includes a head disk assembly (HDA) and a printed circuit board assembly (PCBA) attached to a disk drive base of the HDA. The head disk assembly includes the disk drive base, a cover, at least one magnetic disk, a spindle motor for rotating the disk, and a head stack assembly (HSA) that includes a transducer head supported by a slider (collectively referred to as "head" or "slider") for reading and writing data to and from the disk.

The spindle motor includes a spindle motor hub that is rotatably attached to the disk drive base. The spindle motor hub has an outer hub flange that supports a lowermost one of the disks. Additional disks may be stacked and separated with annular disk spacers that are disposed about the spindle motor hub. The spindle motor typically includes a spindle motor base that is attached to the disk drive base. A shaft is coupled to the spindle motor base and the spindle motor hub surrounds the shaft. The spindle motor hub may be rotatably coupled to the shaft and therefore the spindle motor base typically via a pair of bearing sets. A stator is positioned about the shaft and is attached to the spindle motor base. A magnet element is attached to the hub flange. The stator includes windings that selectively conduct current to create a magnetic field that interacts with the various poles of the magnet element. Such interaction results in forces applied to the spindle motor hub that tend to rotate the spindle motor hub and the attached disks.

The head stack assembly has an actuator assembly having at least one head or slider, typically several, for reading and writing data to and from the disk. The printed circuit board assembly includes a servo control system in the form of a disk controller for generating servo control signals. The head stack assembly is controllably positioned in response to the generated servo control signals from the disk controller. In so doing, the attached sliders are moved relative to tracks disposed upon the disk.

The head stack assembly includes the actuator assembly and a flex circuit cable assembly attached to the actuator assembly. A conventional "rotary" actuator assembly (also referred to as "rotary actuator" or simply "actuator") typically comprises an actuator body, a pivot bearing cartridge, a coil portion that extends from one side of the actuator body to interact with one or more permanent magnets to form a voice coil motor, and one or more actuator arms which extend from an opposite side of the actuator body to a distal end of the actuator assembly. The actuator body includes a bore and the pivot bearing cartridge engaged within the bore for allowing the actuator body to rotate between limited positions. At least one head gimbal assembly (HGA) is distally attached to each of the actuator arms. Each head gimbal assembly biases a head towards the disk. In this regard, the actuator assembly is controllably rotated so as to move the heads relative to the disks for reading and writing operations with respect to the tracks contained on the disks.

A head gimbal assembly includes a suspension assembly, an electrical interconnection, and a head. The suspension assembly (also simply referred to as "suspension") typically includes a base or swage plate, a load beam and a gimbal. The load beam is typically a thin elongate plate spring. One end of the load beam is affixed to a distal end of the actuator arm via a thin hinge plate and the base plate. This may be accomplished through a swage operation. The other end of the load beam supports the gimbal. The gimbal may be integrally formed with the hinge plate that extends from its attachment to the actuator arm and along the length of the load beam. The gimbal in turn supports the slider and is formed to flex in a hinge like manner in relation to the disk. In this regard, the load beam acts to suspend the slider from the actuator arm and therefore the load beam. The load beam transmits a biasing force known as a gram load to the slider to "load" it toward the disk. Because of the aerodynamic characteristics of the slider, rotation of the disks induces airflow that causes the slider to be lifted away from the disk in opposition of the gram load. The slider is said to be "flying" when in this state. A flexure in the form of a thin laminate may be overlaid upon the load beam. The gimbal may be integrally formed with the flexure. The flexure may include an interiorly open frame from which the gimbal is cantilevered to support the slider. The electrical interconnection may take the form of electrical leads that are embedded in the flexure for communicating data signals to and from the head embedded in the slider. In this regard, the electrical interconnection is connected with the flex cable assembly for communication with the printed circuit board assembly.

A topic of concern is the desire to reduce the effects of airflow generated within the disk drive due to rotation of the disks. Of particular concern is the occurrence of turbulent airflow that may tend to excite a resonance response of the actuator assembly. This results in an increase in the percent off-track values of the associated head. Further, such disk rotation induced airflow may result in a force applied to the actuator assembly, i.e., windage. In addition, such disk rotation induced airflow may result in vibration of the disk or disk flutter. Accordingly, there is a need in the art for an improved disk drive for mitigation of such disk rotation induced airflow in comparison to the prior art.

SUMMARY OF THE INVENTION

An aspect of the invention can be regarded as a disk drive that includes a disk drive base and a spindle motor hub rotatably coupled to the disk drive base. The disk drive further includes a disk disposed about the spindle motor hub. The disk drive further includes a rotary actuator rotatably coupled to the disk drive base. The rotary actuator includes a distal end and is formed to pivot for translating the distal end adjacent the disk to a parked position. The disk drive further includes a disk plate. The disk plate includes a plate body coupled to the disk drive base. The plate body is disposed substantially about and parallel with the disk for modifying air flow adjacent the disk during operation of the disk drive. The disk plate further includes a head limiter portion extending from the plate body. The head limiter portion is vertically aligned with the distal end with the distal end in the parked position.

According to various embodiments of the foregoing disk drive, the distal end may be disposed between the head limiter portion and disk with the distal end in the parked position. According to another embodiment, the head limiter portion is disposed between the distal end and disk with the distal end in the parked position. The head limiter portion may be engaged in sliding contact with the distal end with the distal end in the parked position. The distal end includes a suspension assembly, and the head limiter portion may be sized and configured to engage the suspension assembly in sliding contact with the distal end in the parked position. The disk plate may be formed of a metal material, and may include a nonconductive coating. The disk plate may be formed of a molded plastic material. The head limiter portion may be integrally formed with the plate body.

The disk plate may further include an inner disk limiter portion extending from the plate body towards the disk. The disk may include an inner annular non-data region, and the inner disk limiter portion may be vertically aligned with the inner annular non-data region. The inner disk limiter portion may be formed of a metal material, and the inner disk limiter portion may include a nonconductive coating. The inner disk limiter portion may be formed of a plastic material. The inner disk limiter portion may be integrally formed with the plate body. The disk plate may further include an outer disk limiter portion extending from the plate body towards the disk. The disk may include an outer annular non-data region, and the outer disk limiter portion may be vertically aligned with the outer annular non-data region. The outer disk limiter portion may be formed of a metal material, and, the outer disk limiter portion may include a nonconductive coating. The outer disk limiter portion may be formed of a plastic material. The outer disk limiter portion may be integrally formed with the plate body.

According to another aspect of the present invention, there is provided a disk drive that includes a disk drive base, and a spindle motor hub rotatably coupled to the disk drive base. The disk drive further includes a first disk disposed about the spindle motor hub. The disk drive further includes a rotary actuator rotatably coupled to the disk drive base. The rotary actuator includes an actuator arm structure and is formed to pivot for rotating the actuator adjacent the first disk to a parked position. The disk drive further includes a disk plate. The disk plate includes a plate body coupled to the disk drive base. The plate body is disposed substantially about and parallel with the first disk for modifying air flow adjacent the first disk during operation of the disk drive. The disk plate further includes an arm limiter portion extending from the plate body. The arm limiter portion is vertically aligned with the actuator arm structure with the actuator arm structure in the parked position.

According to various embodiments of the foregoing disk drive, the arm limiter portion may include first and second protrusions vertically aligned with the actuator arm structure with the actuator arm structure in the parked position. The first and second protrusions may be vertically aligned with respect to each other, and the arm limiter portion may include a groove formed between the first and second protrusions parallel to the actuator arm structure for receiving the actuator arm structure with the actuator arm structure in the parked position. The first and second protrusion may be vertically off-set with respect to each other. The arm limiter portion may be formed of a layered material with a first layer extending to form the first protrusion and a second layer extending to form the second protrusion. The first and second protrusions may be formed of a continuous piece of material. The actuator arm structure may include an actuator arm, and the arm limiter portion may be vertically aligned with the actuator arm with the actuator arm structure in the parked position.

The disk drive may further include a second disk about the spindle motor hub, and the disk plate may be disposed between the first and second disks. The disk plate may be formed of a metal material. The disk plate may include a nonconductive coating. The disk plate may be formed of a molded plastic material. The arm limiter portion may be integrally formed with the plate body. The disk plate may further include an inner disk limiter portion extending from the plate body towards the disk. The first disk may include an inner annular non-data region, and the inner disk limiter portion may be vertically aligned with the inner annular non-data region. The inner disk limiter portion may be formed of a metal material. The inner disk limiter portion may include a nonconductive coating. The inner disk limiter portion may be formed of a plastic material. The inner disk limiter portion may be integrally formed with the plate body.

The disk plate may further include an outer disk limiter portion extending from the plate body towards the disk. The disk may include an outer annular non-data region, and the outer disk limiter portion may be vertically aligned with the outer annular non-data region. The outer disk limiter portion may be formed of a metal material. The outer disk limiter portion may include a nonconductive coating. The outer disk limiter portion may be formed of a plastic material. The outer disk limiter portion may be integrally formed with the plate body. The rotary actuator may include a distal end, and the disk plate may include a head limiter portion extending from the plate body with the head limiter portion being vertically aligned with the distal end with the distal end in the parked position.

According to another aspect of the present invention, there is provided a disk drive that includes a disk drive base, and a spindle motor hub rotatably coupled to the disk drive base. The disk drive further includes a first disk disposed about the spindle motor hub. The disk drive further includes a rotary actuator rotatably coupled to the disk drive base. The rotary actuator includes an actuator arm structure and is formed to pivot for rotating the actuator adjacent the first disk to a parked position. The disk drive further includes a disk plate. The disk plate includes a plate body coupled to the disk drive base. The plate body is disposed substantially about and parallel with the first disk for modifying air flow adjacent the first disk during operation of the disk drive. The disk plate further includes an arm limiter portion defining a notch horizontally formed in the plate body. The arm limiter portion is vertically aligned with the actuator arm structure with the actuator arm structure in the parked position. The actuator arm structure includes an arm extension extending horizontally towards the disk plate, and the notch is formed to horizontally receive the arm extension.

According to various embodiments of the foregoing disk drive, the actuator arm structure may include an actuator arm, and the arm extension may extend from the actuator arm. The actuator arm structure may include a swage plate, and the arm extension may extend from the swage plate. The disk drive may further include a second disk about the spindle motor hub, and the disk plate may be disposed between the first and second disks. The disk plate may be formed of a metal material. The disk plate may include a nonconductive coating. The disk plate may be formed of a molded plastic material.

The disk plate may further include an inner disk limiter portion extending from the plate body towards the disk. The first disk may include an inner annular non-data region, and the inner disk limiter portion may be vertically aligned with the inner annular non-data region. The inner disk limiter portion may be formed of a metal material. The inner disk limiter portion may include a nonconductive coating. The inner disk limiter portion may be formed of a plastic material. The inner disk limiter portion may be integrally formed with the plate body. The disk plate may further include an outer disk limiter portion extending from the plate body towards the disk. The disk may include an outer annular non-data region, and the outer disk limiter portion may be vertically aligned with the outer annular non-data region. The outer disk limiter portion is formed of a metal material. The outer disk limiter portion may include a nonconductive coating. The outer disk limiter portion may be formed of a plastic material. The outer disk limiter portion may be integrally formed with the plate body. The rotary actuator may include a distal end, and the disk plate may include a head limiter portion extending from the plate body with the head limiter portion being vertically aligned with the distal end with the distal end in the parked position.

BRIEF DESCRIPTION OF THE DRAWINGS

FIG. 4 is an enlarged perspective view of portions of the disk plate, the rotary actuator in a parked position and the disk of FIG. 2;

FIG. 5 is a cross sectional view of portions of a disk plate including head limiter portions and suspension assemblies of the rotary actuator of the FIG. 4 as seen along axis 5—5;

FIG. 6 is a cross sectional view of portions of a disk plate including arm limiter portions and an actuator arm of the rotary actuator of the FIG. 4 as seen along axis 6—6;

FIG. 18 is a perspective view similar to the view of FIG. 16 of portions of a disk plate, however, an extension from a swage plate formed to be received within a notch of the disk plate and portions of a disk according to another embodiment of an aspect of the present invention; and FIG. 19 is a cross sectional view of portions of a disk plate and the actuator arm including the swage plate and extension of the FIG. 18 as seen along axis 19—19.

DESCRIPTION OF THE PREFERRED EMBODIMENTS

Figure 1:
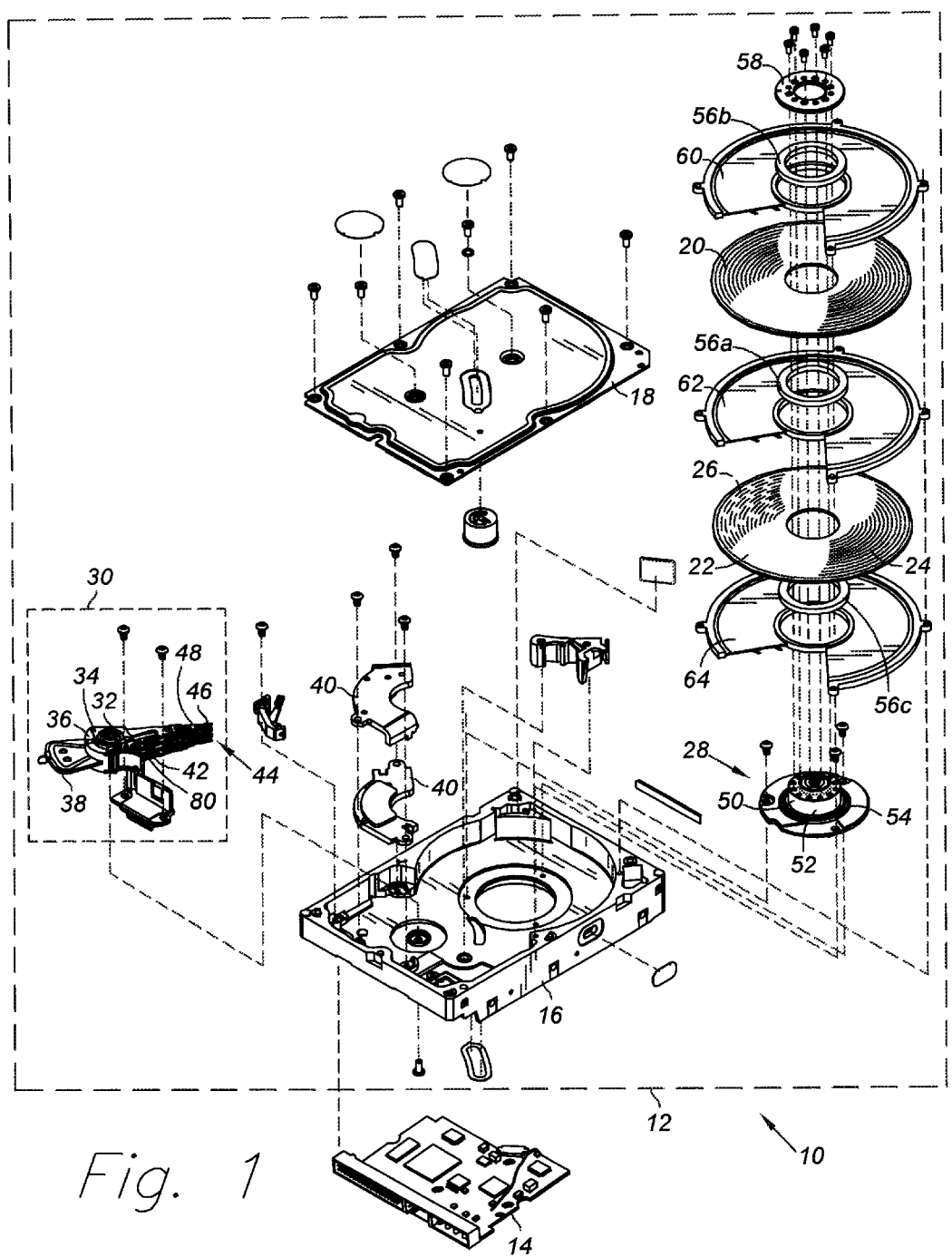
FIG. 1 is an exploded perspective view of a disk drive as constructed in accordance with aspects of the present invention.

Referring now to the drawings wherein the showings are for purposes of illustrating preferred embodiments of the present invention only, and not for purposes of limiting the same, FIGS. 1–19 illustrate a disk drive in accordance with the aspects of the present invention.

Referring now to FIG. 1 there is depicted an exploded perspective view of a disk drive 10 constructed in accordance with an aspect of the present invention. In the embodiment shown, the disk drive 10 includes a head disk assembly (HDA) 12 and a printed circuit board assembly (PCBA) 14. The head disk assembly 12 includes a disk drive base 16 and a cover 18 that collectively house magnetic disks 20, 22. Each of the magnetic disks 20, 22 contains a plurality of tracks for storing data. The magnetic disks 20, 22 may be two-sided, and thus for example, the magnetic disk 22 is shown having a track 24 on an upper facing side and a track 26 (shown in phantom) on a lower facing side. The head disk assembly 12 further includes a spindle motor 28 for rotating the magnetic disks 20, 22. The head disk assembly 12 further includes a head stack assembly 30 and a pivot bearing cartridge 32. The head stack assembly 30 includes a rotary actuator 34.

The rotary actuator 34 includes an actuator body 36 that has a bore and the pivot bearing cartridge 32 engaged within the bore for facilitating the rotary actuator 34 to rotate between limited positions. The rotary actuator 34 further includes a coil portion 38 that extends from one side of the actuator body 36 to interact with a pair of permanent magnets 40 to form a voice coil motor for pivoting the rotary actuator 34. A plurality of actuator arms (the lowermost one of which being denoted 42) extend from an opposite side of the actuator body 36 to a distal end 44 of the rotary actuator 34. As the disks 20, 22 may be two sided, each of the actuator arms 42 include either one or two head gimbal assemblies associated with the adjacent sides of the disks 20, 22. Each head gimbal assembly includes a transducer head (the uppermost one being denoted 46) for reading and writing data to and from the disks 20, 22. Each head gimbal assembly includes a suspension assembly (the to uppermost one being denoted 48), the head 46 and an electrical interconnection for communicating electrical signal to and from the head 46 to the printed circuit board assembly 14.

The spindle motor 28 includes a spindle motor hub 50 that is rotatably attached to the disk drive base 16. The spindle motor hub 50 has a hub body 52 and a hub flange 54 that extends from the hub body 52 for supporting the disk 22. The disks 20, 22 are stacked and separated with an annular disk spacer 56a that is disposed about the hub body 52. A disk clamp 58 is attached about the spindle motor hub 50 and is utilized to apply a clamping force against the topmost disk 20 for securing the disks 20, 22 to the spindle motor hub 50. Additional spacers 56b,c may be provided respectively between the disk clamp 58 and the disk 20 and between the disk 22 and the hub flange 54. The spindle motor 28 typically includes a spindle motor base that is attached to the disk drive base 16. A shaft is coupled to the spindle motor base and the spindle motor hub 50 surrounds the shaft. The spindle motor hub 50 may be rotatably coupled to the shaft and therefore the spindle motor base typically via a pair of bearing sets. A stator is positioned about the shaft and is attached to the spindle motor base. A magnet element is attached at a bottom portion of the hub flange 54. The stator includes windings that selectively conduct current to create a magnetic field that interacts with the various poles of the magnet element. Such interaction results in forces applied to the spindle motor hub 50 that tend to rotate the spindle motor hub 50 and the attached disks 20, 22.

An aspect of the invention can be regarded as the disk drive 10 that includes the disk drive base 16 and the spindle motor hub 50 that is rotatably coupled to the disk drive base 16. The disk drive 10 further includes a disk, such as disk 22, disposed about the spindle motor hub 50. The disk drive 10 further includes the rotary actuator 34 rotatably coupled to the disk drive base 16. The rotary actuator 34 includes the distal end 44 and is formed to pivot for translating the distal end 44 adjacent the disk 22 to a parked position. The disk drive 10 further includes a disk plate, such as disk plate 62 (three disk plates 60, 62, 64 are shown in this embodiment). The disk plate 62 includes a plate body 66 coupled to the disk drive base 16. The plate body 66 is disposed substantially about and parallel with the disk 22 for modifying air flow adjacent the disk 22 during operation of the disk drive 10. Referring additionally to FIGS. 2–7, the disk plate 62 further includes a head limiter portion, such as 68a, extending from the plate body 66. The head limiter portion 68a is vertically aligned with the distal end 44 with the distal end 44 in the parked position.

Figure 2:
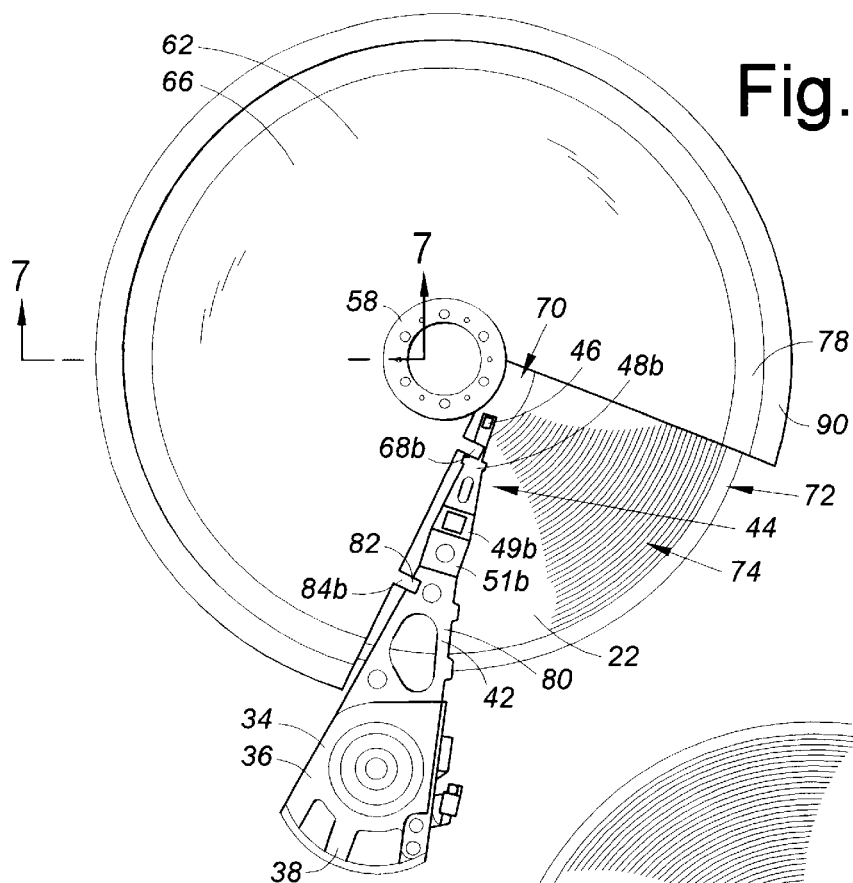
FIG. 2 is a top view of a disk plate, a rotary actuator in a parked position and a lower disk of the disk drive of FIG. 1.
Figure 3:
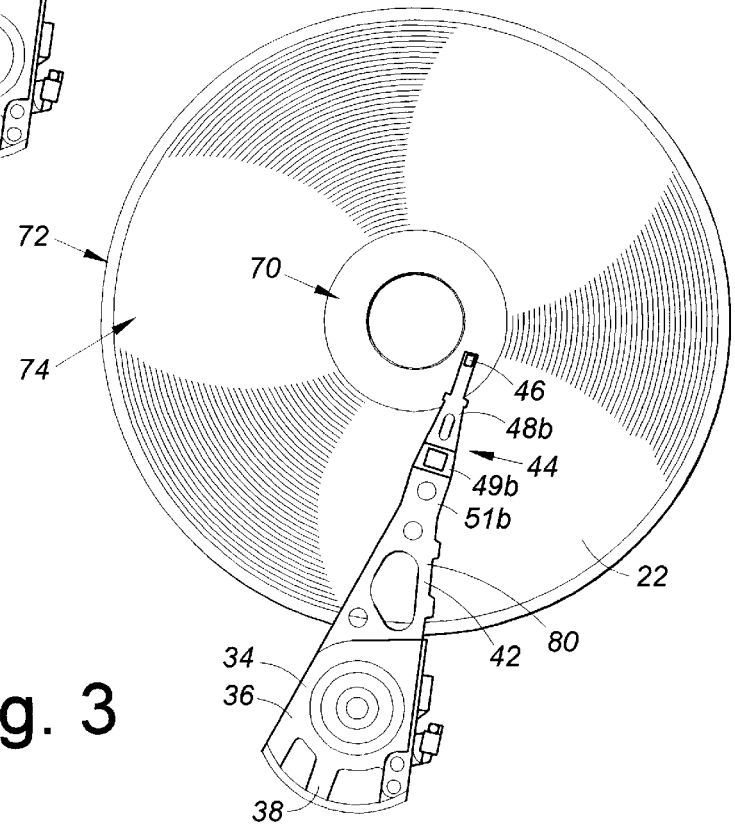
FIG. 3 is a top view of the rotary actuator and the disk of FIG. 2.
Figure 7:
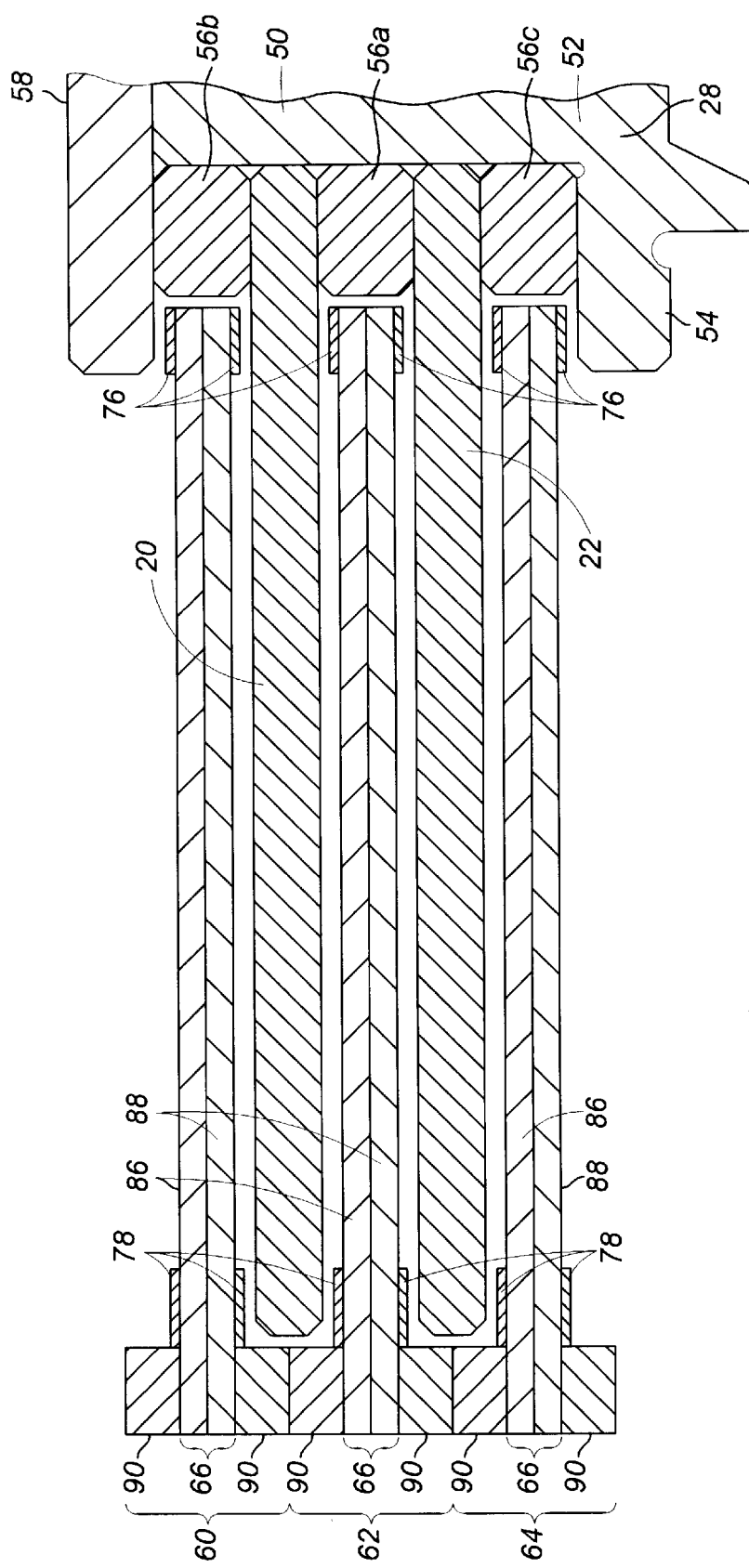
FIG. 7 is a cross sectional view of portions of the disk plates, the disks and a spindle motor hub of the disk drive of FIG. 1 as seen along axis 7—7 of FIG. 2.

In further detail, FIG. 2 depicts a top view of the disk plate 62, the rotary actuator 34 in a parked position and the disk 22 of the disk drive 10 of FIG. 1, and FIG. 3 depicts the same top view with only the rotary actuator 34 and the disk 22 shown. FIG. 4 depicts an enlarged perspective view of portions of the disk plate 62, the rotary actuator 34 and the disk 22 of FIG. 2. FIG. 7 is a cross sectional view of portions of the disk plates 60, 62, 64, the disks 20, 22 and a spindle motor hub 50 of the disk drive 10 of FIG. 1 as seen along axis 7—7 of FIG. 2.

The centermost actuator arm 42 is disposed between the disks 20, 22 and is depicted in FIGS. 2–4 as shown with the disk 22. As seen in FIG. 4, the centermost actuator arm 42 includes a pair of distally attached suspension assemblies 48a,b. The suspension assembly 48a is disposed adjacent disk 22, and the suspension assembly 48b is disposed adjacent disk 20. Both of the suspension assemblies 48a,b may be attached to hinge plates 49a,b, and swage or base plates 51a,b may be used to attach the hinge plates 49 to the actuator arm 42, thereby attaching the suspension assemblies 48a,b to the actuator arm 42. The disk plate 62 additionally may include a head limiter portion 68b which corresponds to the suspension assembly 48b disposed adjacent to a bottom side of disk 20. FIG. 5 depicts a cross sectional view of portions of the disk plate 62 including the head limiter portions 68a,b and the suspension assemblies 48a,b of the FIG. 4 as seen along axis 5—5.

In the embodiment shown, the head limiter portion 68a is disposed between the distal end 44 and the disk 22 with the distal end 44, in the parked position. The head limiter portion 68a may be engaged in sliding contact with the distal end 44 with the distal end 44 in the parked position. In particular, the head limiter portion 68a may be engaged in sliding contact with the suspension assembly 48a with the distal end 44 in the parked position. In this regard, the head limiter portion 68a may be configured to be a ramp-like structure as shown. Similarly, the head limiter portion 68b may be similarly configured to interact with the suspension assembly 48b in relation to the disk 20.

Upon rotation of the distal end 44 into the parked position, the suspension assembly 48a may initially contact the head limiter portion 68a. The head limiter portion 68a may be configured such that continued rotation of the distal end 44 into the final parked position results in the distal end 44, specifically the suspension assembly 48a including the head 46, being displaced away from the disk 22. Thus, upon the distal end 44 being parked, the head 46 is biased away from the disk 22 to mitigate unintended impact of the head 46 with the disk 22. In this regard, the head limiter portion 68a is contemplated to limit the extent of vertical displacement of the distal end 44 (and in particular the suspension assembly 48a) in relation to the disk 22. For example, should the disk drive 10 experience an extreme mechanical shock event, the suspension assembly 48a is contemplated to vibrate with displacement of the head 46 in the vertical direction (towards and away from the disk 22). The head limiter portion 48a of the disk plate 62 acts to limit the extent of such vertical displacement in order to mitigate the slider or head 46 from impacting the disk 22 (i.e., head slap).

The head limiter portion 68a being vertically aligned with the distal end 44 with the distal end 44 in the parked position refers to the head limiter portion 68 being positioned such that an axis perpendicular to the disk 22 intersects both the head limiter portion 68a and the distal end 44 with the distal end 44 in the parked position. Stated differently, there is some degree of vertical overlap of the head limiter portion 68a and the distal end 44 in the parked position. In the embodiment shown in FIG. 4, the distal end 44 of the rotary actuator 34 includes the suspension assemblies 48a,b. As seen in the cross sectional view of FIG. 5, the head limiter portions 68a,b vertically overlap with the suspension assemblies 48a,b with the distal end 44 in the parked position.

As mentioned above, the plate body 66 of the disk plate 62 is disposed substantially about the disk 22. In this regard, the plate body 66 being disposed substantially about the disk 22 refers to the plate body 66 covering or otherwise overlapping at least a majority of the surface area of a given side of the disk 22. Similarly, the plate body 66 is disposed substantially about the disk 20, the plate body 66 of the disk plate 60 is disposed substantially about the disk 20, and the plate body 66 of the disk plate 64 is disposed substantially about the disk 22. It is contemplated that the plate body 66 of each of the disk plates 60, 62, 64 modify the airflow adjacent the disks 20, 22 during operation of the disk drive 10. In this regard, the plate bodies 66 occupy the regions adjacent the disks 20, 22 where airflow patterns may otherwise develop that would tend to interact with the disks 20, 22 and the rotary actuator 34. This may have such beneficial impacts as reduction of airflow that may tend to excite vibration and resonance responses of the rotary actuator 34 and the disks 20, 22.

It is contemplated that the disks 20, 22 include data and non-data regions. In this regard referring to FIG. 3, the disks 20, 22 may each include on each side an inner annular non-data region 70, an outer annular non-data region 72 and a data region 74 disposed therebetween.

The disk plates 60, 62, 64 may further include inner disk limiter portions 76 extending from each plate body 66 towards the adjacent disks 20, 22. The inner disk limiter portions 76 may be vertically aligned with the inner annular non-data regions 70 of the adjacent most one of the disks 20, 22. In this regard, the disk plate 62 includes two inner disk limiter portions 76 respectively associated with the disks 20, 22. The disk plate 60 preferably includes an inner disk limiter portion 76 at least at a lower side thereof adjacent the disk 20. Similarly, the disk plate 64 preferably includes an inner disk limiter portion 76 at least at an upper side thereof adjacent the disk 22.

Though undesirable, it is contemplated that the hub body 52 (and therefore the disks 20, 22) may vertically move relative to the disk plates 60, 62, 64. This may result from relative displacement due to shock or play in a bearing assembly of the spindle motor hub 50 for example. To the extent that the vertical movement is sufficient to otherwise cause contact between the disks 20, 22 and the disk plates 60, 62, 64, the inner disk limiter portions 76 are configured to contact the disks 20, 22. In particular, the inner disk limiter portions 76 are configured to contact the inner annular non-data regions 70. Thus, contact between the disk plates 60, 62, 64 and the data regions 74 of the disks 20, 22 may be avoided. Further, the inner disk limiter portions 76 may provide some degree of flutter damping during operation of the disk drive 10 and shock excitation damping should contact with the disks 20, 22 occur. Moreover, as the inner disk limiter portions 76 limit the vertical movement of the disks 20, 22, they may further tend to mitigate undesirable contact between the disks 20, 22 and portions of the rotary actuator 34.

In one embodiment, the inner disk limiter portions 76 may be formed of a plastic material. In this regard, it is contemplated that the inner disk limiter portions 76 may be separately formed from the plate bodies 66 and may take the form of a gasket like polyamide adhesive tape for example. Such a material may have certain nonconductive electrical properties to mitigate electrostatic discharge but may also provide a degree of mechanical damping. In another embodiment, the inner disk limiter portions 76 may be formed of a metal material. For example, the inner disk limiter portions 76 may be integrally formed with the plate bodies 66 which are also formed of the same metal material. In order to guard against electrostatic discharge, the inner disk limiter portions 76 may include a nonconductive coating.

The disk plates 60, 62, 64 may further include outer disk limiter portions 78 extending from each plate body 66 towards the disks 20, 22. The outer disk limiter portions 78 may be vertically aligned with the outer annular non-data regions 72 of the disks 20, 22. In this regard, the disk plate 62 includes two outer disk limiter portions 78 respectively associated with the disks 20, 22. The disk plate 60 preferably includes an outer disk limiter portion 78 at least at a lower side thereof adjacent the disk 20. Similarly, the disk plate 64 preferably includes an inner disk limiter portion 78 at least at an upper side thereof adjacent the disk 22.

As mentioned above, the hub body 52 (and therefore the disks 20, 22) may undesirably vertically move relative to the disk plates 60, 62, 64. In addition, it is contemplated that the disks 20, 22 may rotate out of the horizontal plane during a disk flutter phenomenon. Like the inner disk limiter portions 76, the outer disk limiter portions 78 may be used to limit and damp movements of the disks 20, 22. Like the inner disk limiter portions 76, the outer disk limiter portions 78 may be formed of a plastic material and may be separately formed from the plate bodies 66. Further like the inner disk limiter portions 76, the outer disk limiter portions 78 may be formed of a metal material that may be integrally formed with the plate bodies 66 and may include a nonconductive coating.

Still referring to FIGS. 1–7, another aspect of the invention can be regarded as the disk drive 10 that includes the disk drive base 16 and the spindle motor hub 50 that is rotatably coupled to the disk drive base 16. The disk drive 10 further includes a disk, such as disk 22, disposed about the spindle motor hub 50. The disk drive 10 further includes the rotary actuator 34 rotatably coupled to the disk drive base 16. The rotary actuator 34 includes an actuator arm structure 80. The actuator arm structure 80 includes at least the actuator arm 42, and may further include structures which are rigidly affixed to the actuator arm 42 such as the swage plate 51 and that portion of the hinge plate 49 which is rigidly affixed to the actuator arm 42 or swage plate 51 and not allowed to flex. The rotary actuator 34 is formed to pivot for rotating the actuator 34 adjacent to the disk 22 to a parked position. The disk drive 10 further includes a disk plate, such as disk plate 62 (three disk plates 60, 62, 64 are shown in this embodiment). The disk plate 62 includes the plate body 66 coupled to the disk drive base 16. The plate body 66 is disposed substantially about and parallel with the disk 22 for modifying air flow adjacent the disk 22 during operation of the disk drive 10. The disk plate 62 further includes an arm limiter portion 82 extending from the plate body 66. The arm limiter portion 82 is vertically aligned with the actuator arm structure 80 with the actuator arm structure 80 in the parked position.

The arm limiter portion 82 being vertically aligned with the actuator arm structure 80 with the actuator arm structure 80 in the parked position refers to the arm limiter portion 82 being positioned such that an axis perpendicular to the disk 22 intersects both the arm limiter portion 82 and the actuator arm structure 80 with the actuator arm structure 80 in the parked position. Stated differently, there is some degree of vertical overlap of the arm limiter portion 82 and the actuator arm structure 80 in the parked position.

It is contemplated that the arm limiter portion 82 limits the vertical movement of the actuator arm structure 80. In the embodiment shown, the arm limiter portion 82 includes first and second protrusions 84a,b. It is understood, however, that the arm limiter portion 82 may take the form of just the first protrusion 84a or just the second protrusion 84b. The first and second protrusions 84a,b are vertically aligned with the actuator arm structure 80, and in particular the actuator arm 42, with the actuator arm structure 42 in the parked position. The actuator arm structure 80 as well as the actuator arm 42 are in the parked position when the rotary actuator 34 is in the parked position. As such, the first protrusion 84a is contemplated to be disposed between the actuator arm 42 and the disk 22, and therefore acts to limit the actuator arm 42 in a direction towards the disk 22 when the actuator arm structure 80 is in the parked position. The second protrusion 84*b* is contemplated to be disposed between the actuator arm 42 and the disk 20, and therefore acts to limit the actuator arm 42 in a direction towards the disk 20 when the actuator arm structure 80 is in the parked position. The arm limiter portion 82 may be formed of a layered material with a first layer extending to form the first protrusion 84*a* and a second layer extending to form the second protrusion 84*b*.

The disk plate 62 (including any of the portions thereof such as the plate body 66) may be formed of a metal material, and may include a nonconductive coating. Further, the disk plate 62 may be formed of a molded plastic material. It is preferable that that plate body 66 includes surface characteristics which are electrically dissipative in nature, such as some types plastics. This may mitigate against build of an electrical charge which may undesirably discharge to the disks 20, 22 or rotary actuator 34. The arm limiter portions 82 may be integrally formed with the plate body 66. Similarly, the head limiter portions 48*a,b* may be integrally formed with the plate body 66. In this regard, with the disk plate 62 being formed of a metal material, the disk body 66 and the head limiter portions 48*a,b* and the arm limiter portions 80 may be formed during a common stamping process. With the disk plate 62 being formed of a molded plastic material, the disk body 66 and the head limiter portions 48*a,b* and the arm limiter portions 80 may be formed during a common molding process.

The plate body 66 may be multilayered. For example, in the embodiment shown in FIGS. 4–7, the plate body 66 includes an upper layer 86 and a lower layer 88. It is contemplated that additional layers may be included. Still referring to the embodiment shown in FIGS. 4–7, the first protrusion 84*a* is integrally formed with the lower layer 88 and the second protrusion 84*b* is integrally formed with the upper layer 86. The head limiter portion 68*a* is integrally formed wit the lower layer 88 and the second protrusion 84*b* is integrally formed with the upper layer 86. It is contemplated that the plate body 66 may be of a single layer design such as in the various embodiments depicted in FIGS. 10–19. In addition, the head limiter portions 48*a,b* and the arm limiter portions 82 may be separately formed from the plate body 66 and attached to the plate body 66.

The disk plates 60, 62, 64 may further include outer spacing bosses 90 which extend from the plate bodies 66. The outer spacing bosses 90 may be sized and configured to allow stacking of adjacent ones of the disk plates 60, 62, 64 and to facilitate attachment of the disk plates 60, 62, 64 to the disk drive base 16.

Figure 8:
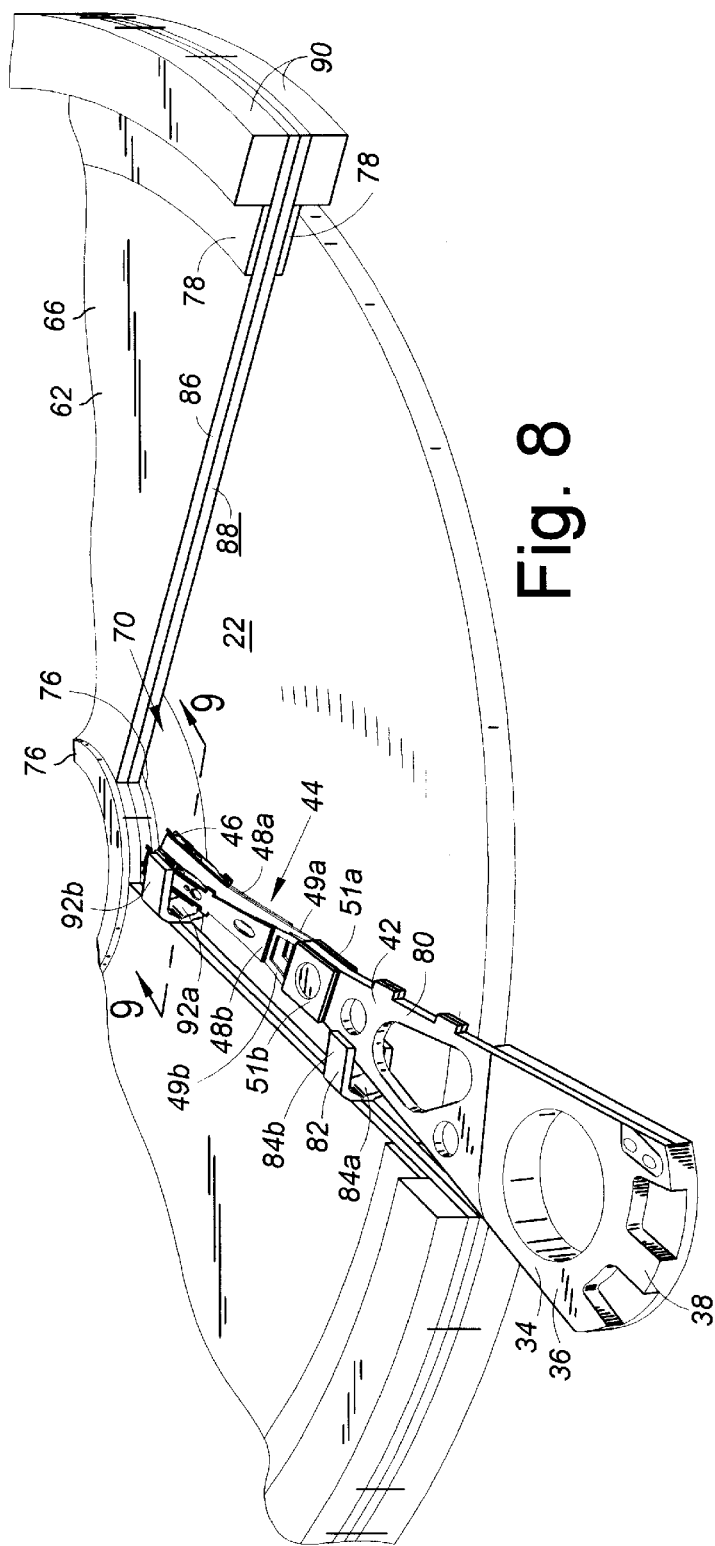
FIG. 8 is a perspective view similar to the view of FIG. 6 of portions of a disk plate, however, with head limiter portions vertically disposed about the associated suspension assemblies of an actuator arm and portions of a disk according to another embodiment of an aspect of the present invention.
Figure 9:
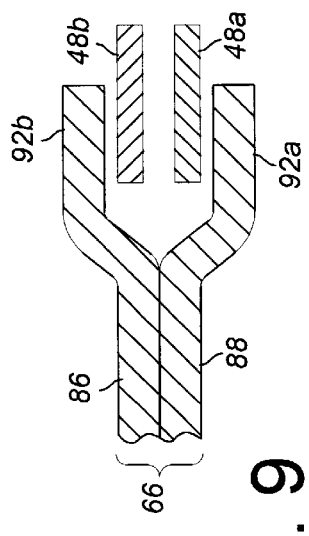
FIG. 9 is a cross sectional view of portions of a disk plate including the head limiter portions and the suspension assemblies of the rotary actuator of the FIG. 8 as seen along axis 9—9.

According to another embodiment, FIGS. 8 and 9 depict the disk plate 62 of FIGS. 1–7, however, with the substitution of head limiter portions 92i a,bin place of the head limiter portions 68*a,b*. FIG. 8 is a perspective view similar to the view of FIG. 6. FIG. 9 is a cross sectional view of portions of the disk plate 62 including the head limiter portions 92*a,b* and the suspension assemblies 48*a,b* of the rotary actuator 34 of the FIG. 8 as seen along axis 9—9. The head limiter portion 92*a* is disposed between the disk 22 and the suspension assembly 48*a* with the rotary actuator 34 in the parked position. The head limiter portion 92*b* is disposed between the disk 20 and the suspension assembly 48*b* with the rotary actuator 34 in the parked position. In this embodiment, the head limiter portions 92*a,b* are configured to be in spaced relation to the suspension assemblies 48*a,b* in their normal undeflected state with the rotary actuator 34 in the parked position. However, it is contemplated that the vertical spacing between the suspension assemblies 48*a,b* and the head limiters 92*a,b* are configured to respectively prevent contact between any portion of the suspension assemblies 48*a,b* and the disks 20, 22.

Figure 10:
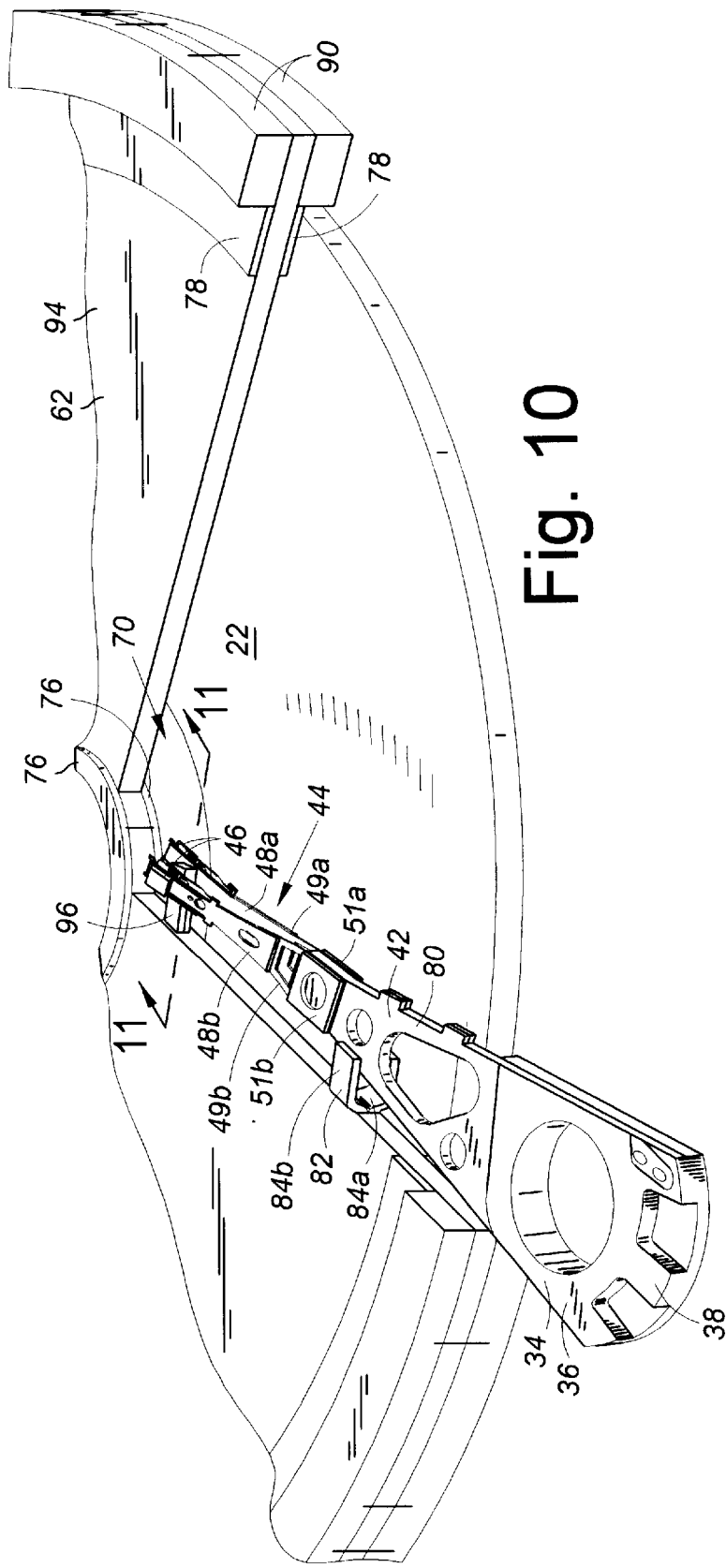
FIG. 10 is a perspective view similar to the view of FIG. 6 of portions of a disk plate, however, with a single head limiter portion disposed between two suspension assemblies of a common actuator arm and portions of a disk according to another embodiment of an aspect of the present invention.
Figure 11:
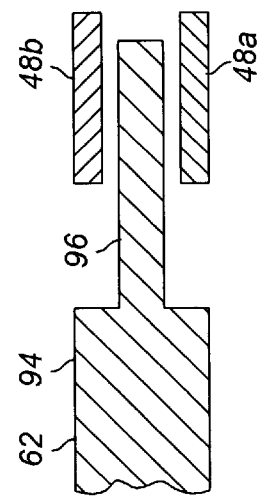
FIG. 11 is a cross sectional view of portions of a disk plate including the single head limiter portion and suspension assemblies of the rotary actuator of the FIG. 10 as seen along axis 11—11.

According to another embodiment, FIGS. 10 and 11 depict the disk plate 62 of FIGS. 1–7, however, with differences as noted below. FIG. 10 is a perspective view similar to the view of FIG. 6. FIG. 9 is a cross sectional view as seen along axis 9—9 of FIG. 8. The disk plate 62 of this embodiment is formed of a single layer 94. Further, the head limiter portions 68*a,b* are substituted with a single head limiter portion 96. In this regard, the suspension assembly 48*a* is disposed between the head limiter portion 96 and the disk 22, and the suspension assembly 48*b* is disposed between the head limiter portion 96 and the disk 20. It is contemplated that the greater the deflection of suspension assemblies 48*a,b* away from the disks 22, 20 the greater the potential impact of the suspension assemblies 48*a,b* against the disks 22, 20 due to the spring like characteristics of the suspension assemblies 48*a,b* (sometimes referred to as "head slap"). The head limiter portion 96 is configured to mitigate such impact of such a head slap phenomenon by limiting the amount of deflection of the suspension assemblies 48*a,b* respectively away from disks 22, 20.

Figure 12:
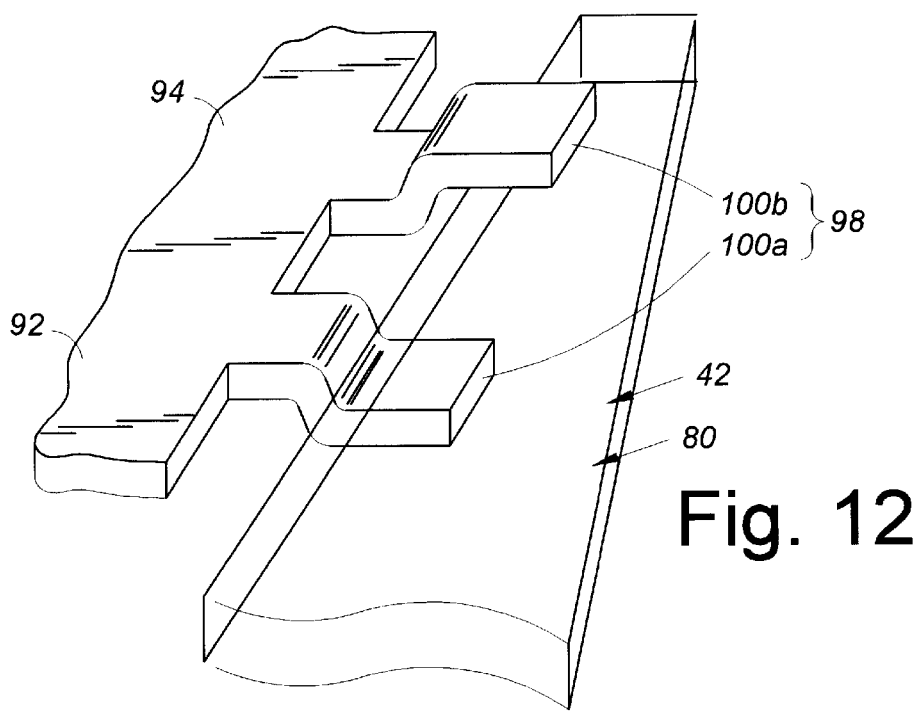
FIG. 12 is an enlarged perspective view similar to the view of FIG. 4 of portions of a disk plate, however, with radially off-set arm limiter portions as shown with an actuator arm (in phantom) according to another embodiment of an aspect of the present invention.

According to another embodiment, FIG. 12 depicts an enlarged perspective view of the disk plate 62 of the embodiment depicted in FIGS. 10 and 11, however with differences as noted below. The disk plate 62 of this embodiment includes an arm limiter portion 98 as substituted for arm limiter portion 82. The arm limiter portion 98 includes first and second protrusions 100*a,b* which are radially off-set with respect to each other. In this regard, the first protrusion 100*a* is radially further away from the centermost portion of the disk plate in comparison to the second protrusion 100*b*. Like the first and second protrusions 84*a,b*, the first and second protrusions 100*a,b* are configured to limit the vertical movement or deflection of the actuator arm structure 80 and the actuator arm 42 (both shown in phantom for ease of illustration of the first and second protrusions 100*a,b*. The first and second protrusions 100*a,b* are formed of a continuous piece of material and are integrally formed with the plate body 94. This may be accomplished by a stamping process for example.

Figure 13:
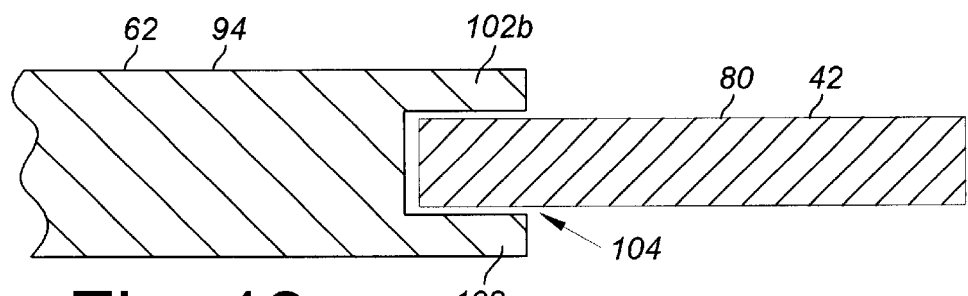
FIG. 13 is a cross sectional view similar to the view of FIG. 6 portions of a disk plate, however, with arm limiter portions with a groove formed there between and an actuator arm.

According to another embodiment, FIG. 13 depicts a cross sectional view of the disk plate 62 of the embodiment depicted in FIGS. 10 and 11, however with differences as noted below. The disk plate 62 of this embodiment includes first and second protrusions 102*a,b* defining an arm limiter portion as substituted for first and second protrusions 84*a,b*. The first and second protrusions 102*a,b* are vertically aligned with respect to each other, and a groove 104 is formed between the first and second protrusions 102*a,b* parallel to the actuator arm structure 80 for receiving the actuator arm structure 80 with the actuator arm structure in the parked position 80.

Figure 14:
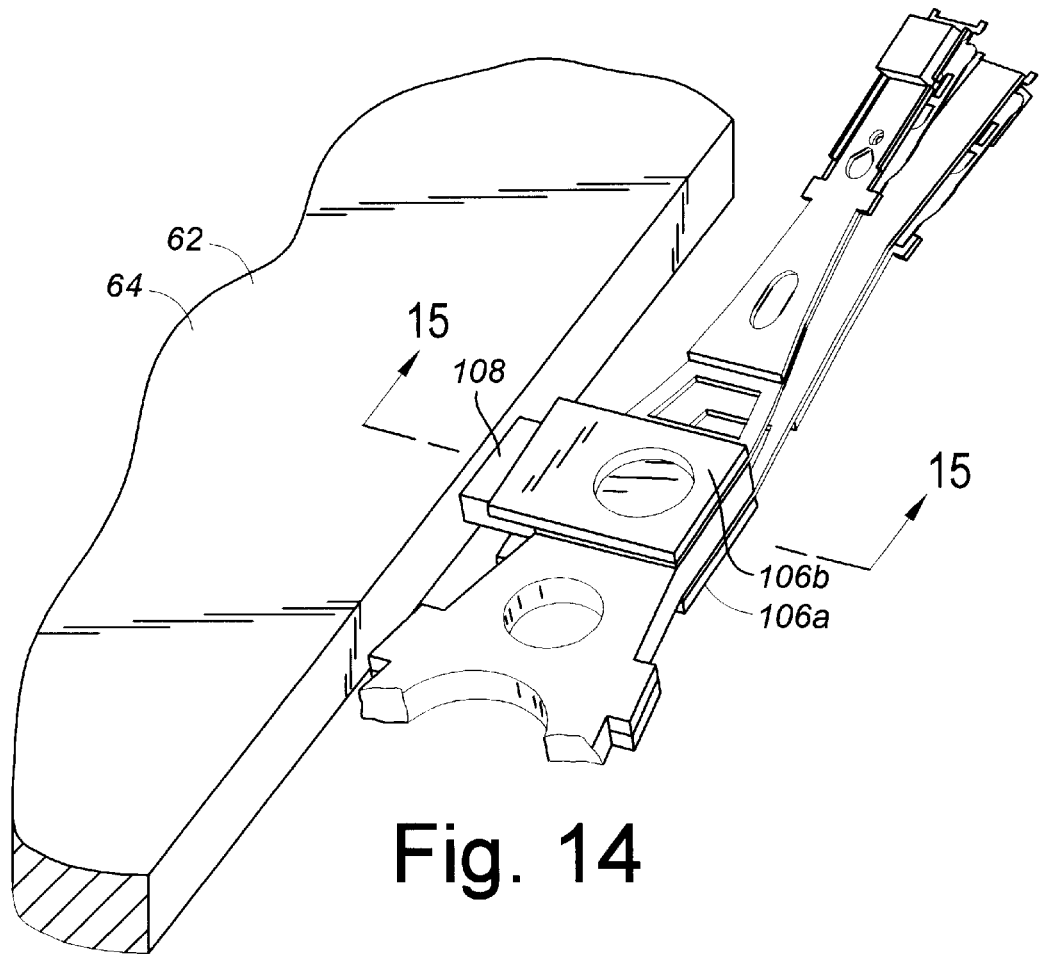
FIG. 14 is an enlarged perspective view similar to the view of FIG. 4 of portions of a disk plate, however, with a single arm limiter portion extending between two swage plates of an actuator arm according to another embodiment of an aspect of the present invention.
Figure 15:
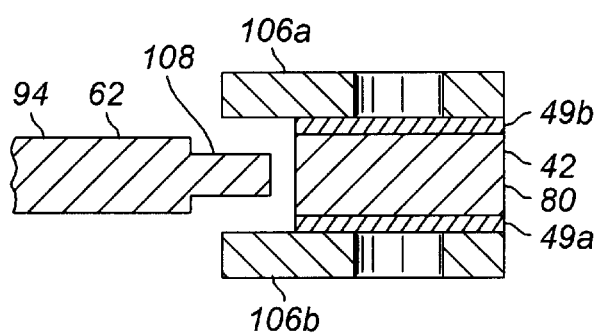
FIG. 15 is a cross sectional view of portions of the disk plate including the arm limiter portion and the actuator arm of the rotary actuator of the FIG. 14 as seen along axis 15—15.

According to another embodiment, FIGS. 14 and 15 depict an enlarged perspective view of the disk plate 62 and the actuator arm structure 80 of the embodiment depicted in FIGS. 10 and 11, however with differences as noted below. The disk plate 62 of this embodiment includes an arm limiter portion 108 as substituted for the arm limiter portion 82. The arm limiter portion 108 extends from the plate body 94 as a unitary structure. In addition, the actuator arm structure 80 includes swage plates 106*a,b* as substituted for the swage plates 51*a,b*. The swage plates 106*a,b* are configured to extend beyond the width of the actuator arm 42. The arm limiter portion 108 is configured to be vertically aligned and between the swage plates 106*a,b* with the actuator arm structure 80 in the parked position. As such, the arm limiter portion 108 is contemplated to limit the vertical movement or deflection of the actuator arm structure 80 and the actuator arm 42 through contact with either of the swage plates 106*a,b*.

Figure 16:
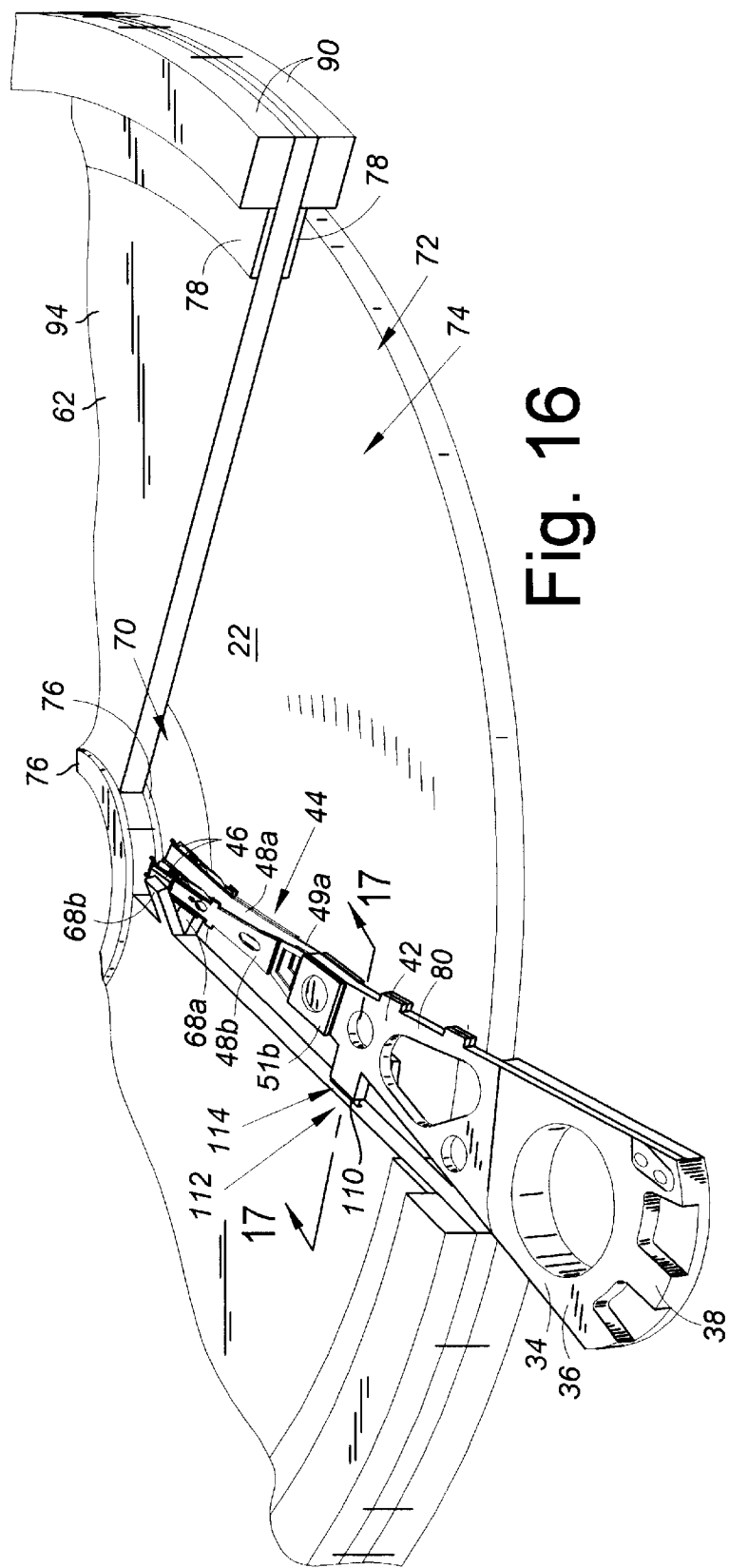
FIG. 16 is a perspective view similar to the view of FIG. 6 of portions of a disk plate, however, with a notch and an actuator arm including an extension formed to be received within the notch and portions of a disk according to another embodiment of an aspect of the present invention.
Figure 17:
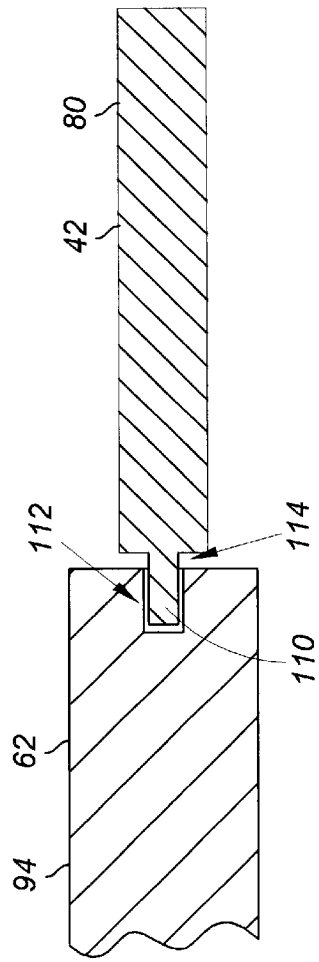
FIG. 17 is a cross sectional view of portions of a disk plate and the actuator arm including the extension of the FIG. 16 as seen along axis 17—17.

Referring to FIGS. 16 and 17, another aspect of the invention can be regarded as the disk drive 10 that includes the disk plate 62 and the actuator arm structure 80 as described above, however, with the differences noted below. The particular embodiment of the disk plate 62 shown is similar in configuration to that of FIG. 4 with a plate body 94 of FIG. 10. According to this aspect of the present invention, the disk plate 62 includes an arm limiter portion 112 defining a notch 114 horizontally formed in the plate body 94. The arm limiter portion 112, and in particular the notch 114, is vertically aligned with the actuator arm structure 80 with the actuator arm structure 80 in the parked position. The actuator arm structure 80 includes an arm extension 110 extending horizontally towards the disk plate 62, and the notch 114 is formed to horizontally receive the arm extension 110. In this particular embodiment, the arm extension 110 extends from the actuator arm 42.

According to another embodiment, FIGS. 18 and 19 depict the disk plate 62 of FIGS. 16 and 17, however, with the differences noted below. The disk plate 62 includes an arm limiter portion 120 defining a notch 122 as substituted for the arm limiter portion 112 and notch 114. The actuator arm structure 80 includes a swage plate 116 as substituted for the swage plate 51b. The swage plate 116 includes an arm extension 118 that extends from the swage plate 116. The arm limiter portion 120, and in particular the notch 122, is vertically aligned with the actuator arm structure 80 with the actuator arm structure 80 in the parked position. The arm extension 118 extends horizontally towards the disk plate 62, and the notch 122 is formed to horizontally receive the arm extension 118.

We claim:

1. A disk drive comprising:
a disk drive base;
a spindle motor hub rotatably coupled to the disk drive base;
a disk disposed about the spindle motor hub;
a rotary actuator rotatably coupled to the disk drive base, the rotary actuator including a distal end, the rotary actuator formed to pivot for translating the distal end adjacent the disk to a parked position;
a disk plate including:
plate body coupled to the disk drive base, the plate body disposed substantially about and parallel with the disk for modifying air flow adjacent the disk during operation of the disk drive; and
a head limiter portion extending from the plate body, the head limiter portion being vertically aligned with the distal end in the parked position.

2. The disk drive of claim 1 wherein the distal end is disposed between the head limiter portion and disk with the distal end in the parked position.

3. The disk drive of claim 1 wherein the head limiter portion is disposed between the distal end and disk with the distal end in the parked position.

4. The disk drive of claim 3 wherein the head limiter portion is engaged in sliding contact with the distal end with the distal end in the parked position.

5. The disk drive of claim 4 wherein the distal end includes a suspension assembly, the head limiter portion is sized and configured to engage the suspension assembly in sliding contact with the distal end in the parked position.

6. The disk drive of claim 1 wherein the disk plate is formed of a metal material.

7. The disk drive of claim 6 wherein the disk plate includes a nonconductive coating.

8. The disk drive of claim 1 wherein the disk plate is formed of a molded plastic material.

9. The disk drive of claim 1 wherein the head limiter portion is integrally formed with the plate body.

10. The disk drive of claim 1 wherein the disk plate further includes an inner disk limiter portion extending from the plate body towards the disk.

11. The disk drive of claim 10 wherein the disk includes an inner annular non-data region, the inner disk limiter portion is vertically aligned with the inner annular non-data region.

12. The disk drive of claim 10 wherein the inner disk limiter portion is formed of a metal material.

13. The disk drive of claim 12 wherein the inner disk limiter portion includes a nonconductive coating.

14. The disk drive of claim 10 wherein the inner disk limiter portion is formed of a plastic material.

15. The disk drive of claim 10 wherein the inner disk limiter portion is integrally formed with the plate body.

16. The disk drive of claim 1 wherein the disk plate further includes an outer disk limiter portion extending from the plate body towards the disk.

17. The disk drive of claim 16 wherein the disk includes an outer annular non-data region, the outer disk limiter portion is vertically aligned with the outer annular non-data region.

18. The disk drive of claim 16 wherein the outer disk limiter is formed of a metal material.

19. The disk drive of claim 18 wherein the outer disk limiter portion includes a nonconductive coating.

20. The disk drive of claim 16 wherein the outer disk limiter portion is formed of a plastic material.

21. The disk drive of claim 16 wherein the outer disk limiter portion is integrally formed with the plate body.

22. A disk drive comprising:
a disk drive base;
a spindle motor hub rotatably coupled to the disk drive base;
a first disk disposed about the spindle motor hub;
a rotary actuator rotatably coupled to the disk drive base, the rotary actuator including an actuator arm structure, the rotary actuator formed to pivot for rotating the actuator adjacent the first disk to a parked position;
a disk plate including;
a plate body coupled to the disk drive base, the plate body disposed substantially about and parallel with the first disk for modifying air flow adjacent the first disk during operation of the disk drive; and
an arm limiter portion extending from the plate body, the arm limiter portion being vertically aligned with the actuator arm structure in the parked position.

23. The disk drive of claim 22 wherein the arm limiter portion includes first and second protrusions vertically aligned with the actuator arm structure with the actuator arm structure in the parked position.

24. The disk drive of claim 23 wherein the first and second protrusions are vertically aligned with respect to each other, the arm limiter portion includes a groove formed between the first and second protrusions parallel to the actuator arm structure for receiving the actuator arm structure with the actuator arm structure in the parked position.

25. The disk drive of claim 23 wherein the first and second protrusion are vertically off-set with respect to each other.

26. The disk drive of claim 23 wherein the arm limiter portion is formed of a layered material with a first layer extending to form the first protrusion and a second layer extending to form the second protrusion.

27. The disk drive of claim 23 wherein the first and second protrusions are formed of a continuous piece of material.

28. The disk drive of claim 22 wherein the actuator arm structure includes an actuator arm, the arm limiter portion is vertically aligned with the actuator a with the actuator arm structure in the parked position.

29. The disk drive of claim 22 further includes a second disk about the spindle motor hub, the disk plate is disposed between the first and second disks.

30. The disk drive of claim 22 wherein the disk plate is formed of a metal material.

31. The disk drive of claim 30 wherein the disk plate includes a nonconductive coating.

32. The disk drive of claim 22 wherein the disk plate is formed of a molded plastic material.

33. The disk drive of claim 22 wherein the arm limiter portion is integrally formed with the plate body.

34. The disk drive of claim 22 wherein the disk plate further includes an inner disk, limiter portion extending from the plate body towards the disk.

35. The disk drive of claim 34 wherein the first disk includes an inner annular non-data region, the inner disk limiter portion is vertically aligned with the inner annular non-data region.

36. The disk drive of claim 34 wherein the inner disk limiter portion is formed of a metal material.

37. The disk drive of claim 36 wherein the inner disk limiter portion includes a nonconductive coating.

38. The disk drive of claim 34 wherein the inner portion is formed of a plastic material.

39. The disk drive of claim 34 wherein the inner disk limiter portion is integrally formed with the plate body.

40. The disk drive of claim 22 wherein the disk plate further includes an outer disk limiter portion extending from the plate body towards the disk.

41. The disk drive of claim 40 wherein the disk includes an outer annular non-data region, the outer disk limiter portion is vertically aligned with the outer annular non-data region.

42. The disk drive of claim 40 wherein the outer disk limiter portion is formed of a metal material.

43. The disk drive of claim 42 wherein the outer disk limiter portion includes a nonconductive coating.

44. The disk drive of claim 40 wherein the outer disk limiter portion is formed of a plastic material.

45. The disk drive of claim 40 wherein the outer disk limiter portion is integrally formed with the plate body.

46. The disk drive of claim 22 wherein the rotary actuator includes a distal end, the disk plate includes a head limiter portion extending from the plate body, the head limiter portion is vertically aligned with the distal end with the distal end in the parked position.

47. A disk drive comprising:
  a disk drive base;
  a spindle motor hub rotatably coupled to the disk drive base;
  a first disk disposed about the spindle motor hub;
  a rotary actuator rotatably coupled to the disk drive base, the rotary actuator including an actuator arm structure, the rotary actuator formed to pivot for rotating the actuator adjacent the first disk to a parked position;
  a disk plate including:
    a plate body coupled to the disk drive base, the plate body disposed substantially about and parallel with the first disk for modifying air flow adjacent the first disk during operation of the disk drive; and
    an arm limiter portion defining a notch horizontally formed in the plate body, the arm limiter portion being vertically aligned with the actuator arm structure in the parked position;
  wherein the actuator arm structure includes an arm extension extending horizontally towards the disk plate, the notch is formed to horizontally receive the arm extension.

48. The disk drive of claim 47 wherein the actuator arm structure includes an actuator arm, the arm extension extends from the actuator arm.

49. The disk drive of claim 47 wherein the actuator arm structure includes a swage plate, the arm extension extends from the swage plate.

50. The disk drive of claim 47 further includes a second disk about the spindle motor hub, the disk plate is disposed between the first and second disks.

51. The disk drive of claim 47 wherein the disk plate is formed of a metal material.

52. The disk drive of claim 51 wherein the disk plate includes a nonconductive coating.

53. The disk drive of claim 47 wherein the disk plate is formed of a molded plastic material.

54. The disk drive of claim 47 wherein the disk plate further includes an inner disk limiter extending from the plate body towards the disk.

55. The disk drive of claim 54 wherein the first disk includes an inner annular non-data region, the inner disk limiter portion is vertical aligned with inner annular non-data region.

56. The disk drive of claim 54 wherein the inner disk limiter portion is formed of a metal material.

57. The disk of claim 56 wherein the inner disk limiter portion includes a nonconductive coating.

58. The disk drive of claim 54 wherein the inner disk limiter portion is formed of a plastic material.

59. The disk drive of claim 54 wherein the inner disk limiter portion is integrally formed with the plate body.

60. The disk drive of claim 47 wherein the disk plate further includes an outer disk limiter portion extending from the plate body towards the disk.

61. The disk drive of claim 60 wherein the disk includes an outer annular non-data region, the outer disk limiter portion is vertically aligned with the outer annual non-data region.

62. The disk drive of claim 60 wherein the outer disk limiter portion is formed of a material.

63. The disk drive of claim 62 wherein the outer disk limiter portion includes a nonconductive coating.

64. The disk drive of claim 60 wherein the outer disk limiter portion is formed of a plastic material.

65. The disk drive of claim 60 wherein the outer disk limiter portion is integrally formed with the plated body.

66. The disk drive of claim 47 wherein the rotary actuator includes a distal end, the disk plate includes a head limiter portion extending from the plate body, the head limiter portion is vertically aligned with the distal end with the distal end in the parked position.

* * * * *